J. A. MONTGOMERY.
Hay-Fork.
No. 52,186. Patented Jan. 23. 1866
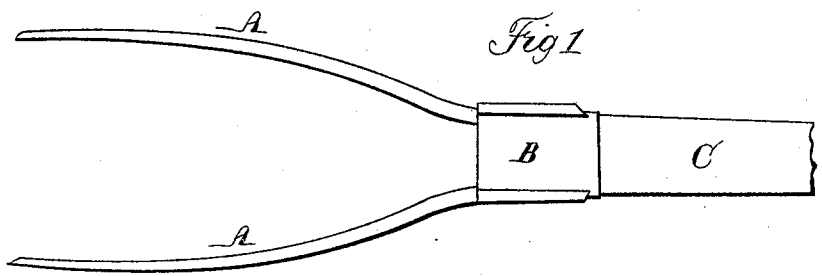
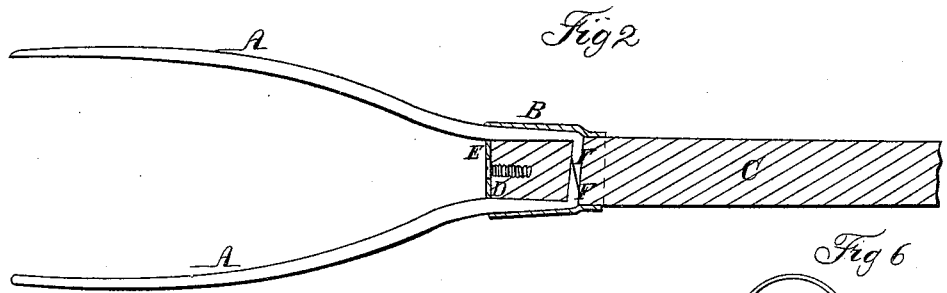
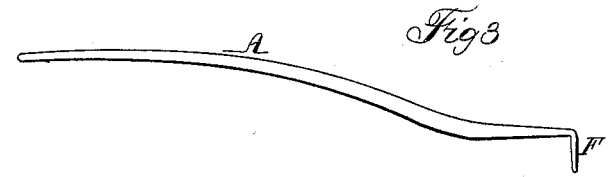
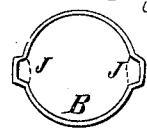
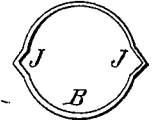
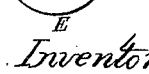
Witnesses:
Jas. H. Pilson
AJ Dichick
Inventor:
J A Montgomery

UNITED STATES PATENT OFFICE.

J. A. MONTGOMERY, OF WILLIAMSPORT, PENNSYLVANIA.

IMPROVEMENT IN HAY-FORKS.

Specification forming part of Letters Patent No. 52,186, dated January 23, 1866.

*To all whom it may concern:*

Be it known that I, J. A. MONTGOMERY, now of Williamsport, in the county of Lycoming and State of Pennsylvania, have invented a new and Improved Hay and Manure Fork; and I do hereby declare that the following is a full, clear, and exact description of the construction of the same, reference being had to the annexed drawings, making a part of this specification, in which—

Figure 1 is a plan view of the fork as attached to the handle. Fig. 2 is a sectional view. Fig. 3 is a view of the prongs or tines. Figs. 4, 5, and 6 are views of the bands and ends holding the tines, these figures being end views of the bands and end pieces.

In all of the above drawings the same letter, so often as it is used, refers to the same part.

To enable others skilled in the art to make my invention, I will proceed to describe its construction.

I construct the tines or prongs separate, as shown in Fig. 3, in which A A are the tines and F F are projections for driving into the handle, as shown in Fig. 2, in which C is the handle, A A the tines, and F F the projections driven into the handle. I make the handle at the fork end a trifle larger than at the other, and make bands, as shown by B in the different figures, of such taper as to fit closely to the handle and tines. I cut a small recess on each side of the handle to fit the shanks of the tines, and after driving in the projections or hooks of the tines I drive on the band B, as shown in Figs. 1 and 2, projecting far enough beyond the end of the handle to admit the end piece, E, which, with the tines, fills closely the end of the band, and is held in place by a screw, as shown by D in Fig. 2, or other fastening.

For tines of round steel I make the band and end piece as shown in Fig. 4, in which J and L are the recesses for holding the tines. For tines of square steel I make the band and end piece as shown in Fig. 5. For forks of four tines I make the band and end piece as shown in Fig. 6, in which the recesses J and L are made wide enough to each receive the shanks of two tines. For forks of three tines I insert the center tine in the end of the handle through a hole in the center of the end piece, where the screw D would otherwise be placed.

What I claim as my invention, and desire to secure by Letters Patent, is—

The combination of the tines A, bent, as described, band B, and plate E, substantially as and for the purpose described.

J. A. MONTGOMERY.

Witnesses:
JAS. H. PILSON,
A. J. DIETRICK.